United States Patent
He et al.

(10) Patent No.: US 9,686,064 B2
(45) Date of Patent: Jun. 20, 2017

(54) DEVICES AND METHODS FOR HARQ-ACK FEEDBACK SCHEME ON PUSCH IN WIRELESS COMMUNICATION SYSTEMS

(71) Applicant: Intel IP Corporation, Santa Clara, CA (US)

(72) Inventors: Hong He, Beijing (CN); Seunghee Han, Cupertino, CA (US); Hwan-Joon Kwon, Santa Clara, CA (US); Gang Xiong, Beaverton, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/751,054

(22) Filed: Jun. 25, 2015

(65) Prior Publication Data

US 2016/0212734 A1    Jul. 21, 2016

Related U.S. Application Data

(60) Provisional application No. 62/105,850, filed on Jan. 21, 2015.

(51) Int. Cl.
*H04L 5/00* (2006.01)
*H04L 1/18* (2006.01)

(52) U.S. Cl.
CPC .......... *H04L 5/0048* (2013.01); *H04L 1/1861* (2013.01); *H04L 5/0055* (2013.01); *H04L 1/1812* (2013.01)

(58) Field of Classification Search
None
See application file for complete search history.

(56) References Cited

U.S. PATENT DOCUMENTS

2012/0039279 A1* 2/2012 Chen ................... H04L 1/1861
370/329
2012/0039280 A1 2/2012 Chen et al.
(Continued)

FOREIGN PATENT DOCUMENTS

WO    WO-2016118240 A1    7/2016

OTHER PUBLICATIONS

"International Application Serial No. PCT/US2015/064477, International Search Report mailed Jun. 3, 2016", 9 pgs.
(Continued)

*Primary Examiner* — Mohammad Adhami
(74) *Attorney, Agent, or Firm* — Schwegman Lundberg & Woessner, P.A.

(57) ABSTRACT

Devices and methods of reducing overall Hybrid Automatic Repeat Request-Acknowledgment (HARQ-ACK) of user equipment (UE) using a large amount of carrier aggregation are generally described. The UE may receive a subframe from an enhanced NodeB (eNB). The subframe may contain a physical downlink control channel (PDCCH) formed in accordance with a Downlink Control information (DCI) format. The DCI format may comprise a Downlink Assignment Index (DAI) for Time Division Duplexed (TDD) and Frequency Division Duplexed (FDD) operation. The UE may determine, dependent on the DAI, a number and ordering of Hybrid Automatic Repeat Request-Acknowledgment (HARQ-ACK) bits to be transmitted on a Physical Uplink Shared Channel (PUSCH) and subsequently transmit the HARQ-ACK bits.

13 Claims, 8 Drawing Sheets

(56) References Cited

U.S. PATENT DOCUMENTS

| | | |
|---|---|---|
| 2014/0105076 A1 | 4/2014 | Yang et al. |
| 2014/0293893 A1* | 10/2014 | Papasakellariou .... H04W 72/04 370/329 |
| 2014/0293932 A1 | 10/2014 | Papasakellariou et al. |
| 2014/0307596 A1 | 10/2014 | He et al. |
| 2014/0369242 A1* | 12/2014 | Ng .................... H04W 72/0453 370/280 |
| 2015/0124670 A1* | 5/2015 | Park ..................... H04L 1/1671 370/281 |
| 2015/0146588 A1* | 5/2015 | Park ..................... H04L 5/0055 370/280 |
| 2016/0270060 A1* | 9/2016 | Kusashima ........... H04L 1/1854 |

OTHER PUBLICATIONS

"International Application Serial No. PCT/US2015/064477, Written Opinion mailed Jun. 3, 2016", 11 pgs.

* cited by examiner

DEVICES AND METHODS FOR HARQ-ACK FEEDBACK SCHEME ON PUSCH IN WIRELESS COMMUNICATION SYSTEMS

PRIORITY CLAIM

This application claims the benefit of priority to U.S. Provisional Patent Application Ser. No. 62/105,850, filed Jan. 21, 2015, and entitled "NOVEL HARQ-ACK FEEDBACK SCHEME ON PUSCH IN WIRELESS COMMUNICATION SYSTEMS," which is incorporated herein by reference in its entirety.

TECHNICAL FIELD

Embodiments pertain to radio access networks. Some embodiments relate to Hybrid Automatic Repeat Request-Acknowledgment (HARQ-ACK) mechanisms in cellular networks, including Third Generation Partnership Project Long Term Evolution (3GPP LTE) networks and LTE advanced (LTE-A) networks as well as $4^{th}$ generation (4G) networks and $5^{th}$ generation (5G) networks.

BACKGROUND

With the ever increasing desire for faster data rates, notably through long-term evolution-Advanced (LTE-A) networks in Release 10, system designers have turned several different techniques such as multiple input multiple output (MIMO), cooperative multiple point transmission (CoMP) and carrier aggregation. Carrier aggregation increases bandwidth, and thus bitrate, by aggregating multiple carriers to form a larger overall transmission bandwidth. The explosive increase in mobile data consumption has led to a LTE deployment and carrier aggregation in the unlicensed spectrum (LTE-Unlicensed (LTE-U), with UEs using the LTE-U band referred to as License Assisted Access (LAA) UEs). With increasing carrier aggregation, the HARQ-ACK response may take up a large amount of overhead.

It would be desirable to minimize the HARQ-ACK overhead while maintaining HARQ-ACK performance.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
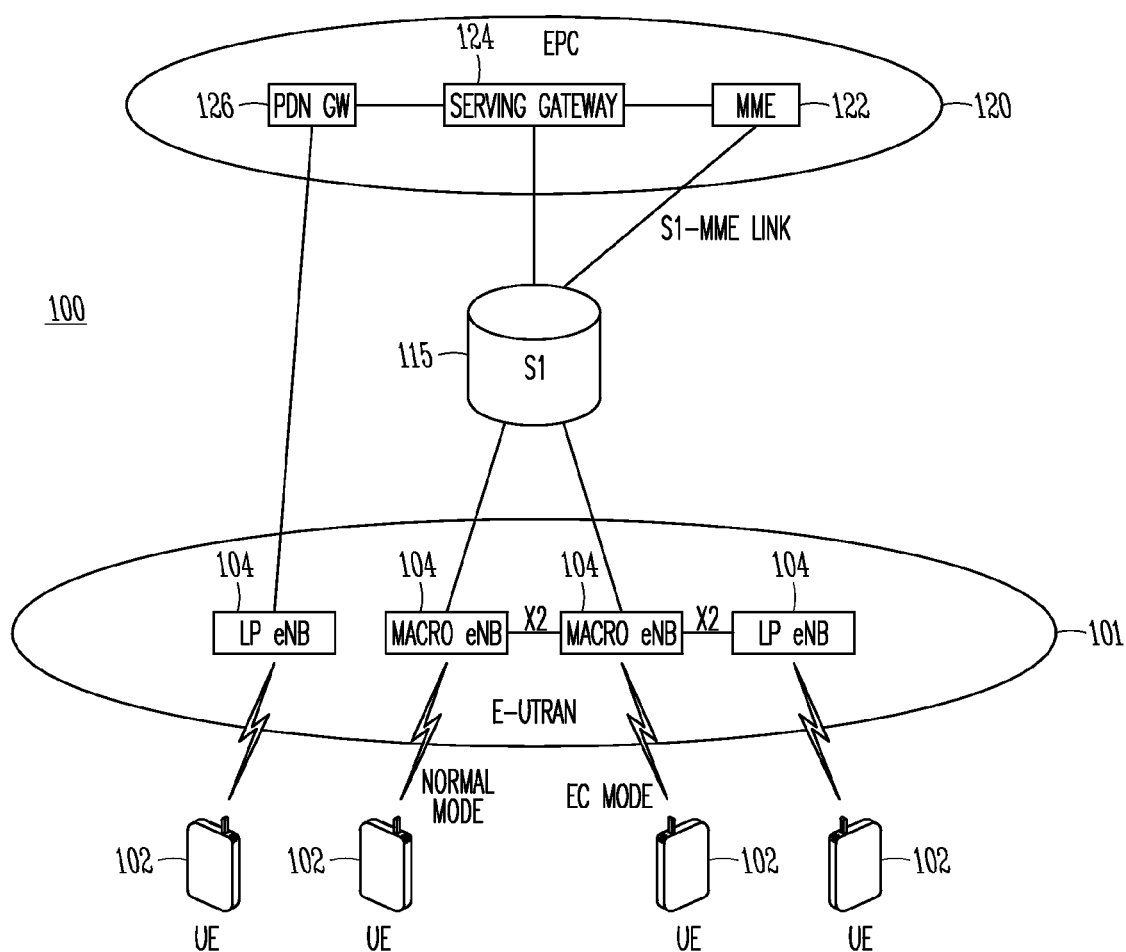
FIG. 1 shows an example of a portion of an end-to-end network architecture of an LTE network with various components of the network in accordance with some embodiments.

FIG. 1 shows an example of a portion of an end-to-end network architecture of a Long Term Evolution (LTE) network with various components of the network in accordance with some embodiments. As used herein, an LTE network refers to both LTE and LTE Advanced (LTE-A) networks as well as other versions of LTE networks to be developed. The network 100 may comprise a radio access network (RAN) (e.g., as depicted, the E-UTRAN or evolved universal terrestrial radio access network) 101 and core network 120 (e.g., shown as an evolved packet core (EPC)) coupled together through an S1 interface 115. For convenience and brevity, only a portion of the core network 120, as well as the RAN 101, is shown in the example.

The core network 120 may include a mobility management entity (MME) 122, serving gateway (serving GW) 124, and packet data network gateway (PDN GW) 126. The RAN 101 may include eNBs 104 (which may operate as base stations) for communicating with UE 102. The eNBs 104 may include macro eNBs and low power (LP) eNBs.

The MME 122 may be similar in function to the control plane of legacy Serving GPRS Support Nodes (SGSN). The MME 122 may manage mobility aspects in access such as gateway selection and tracking area list management. The serving GW 124 may terminate the interface toward the RAN 101, and route data packets between the RAN 101 and the core network 120. In addition, the serving GW 124 may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 may terminate an SGi interface toward the packet data network (PDN). The PDN GW 126 may route data packets between the EPC 120 and the external PDN, and may perform policy enforcement and charging data collection. The PDN GW 126 may also provide an anchor point for mobility devices with non-LTE access. The external PDN can be any kind of IP network, as well as an IP Multimedia Subsystem (IMS) domain. The PDN GW 126 and the serving GW 124 may be implemented in a single physical node or separate physical nodes.

The eNBs 104 (macro and micro) may terminate the air interface protocol and may be the first point of contact for a UE 102. In some embodiments, an eNB 104 may fulfill various logical functions for the RAN 101 including, but not limited to, RNC (radio network controller functions) such as radio bearer management, uplink and downlink dynamic radio resource management and data packet scheduling, and mobility management. In accordance with embodiments, UEs 102 may be configured to communicate orthogonal frequency division multiplexed (OFDM) communication signals with an eNB 104 over a multicarrier communication channel in accordance with an OFDMA communication technique. The OFDM signals may comprise a plurality of orthogonal subcarriers.

The S1 interface 115 may be the interface that separates the RAN 101 and the EPC 120. It may be split into two parts: the S1-U, which may carry traffic data between the eNBs 104 and the serving GW 124, and the S1-MME, which may be a signaling interface between the eNBs 104 and the MME 122. The X2 interface may be the interface between eNBs 104. The X2 interface may comprise two parts, the X2-C and X2-U. The X2-C may be the control plane interface between the eNBs 104, while the X2-U may be the user plane interface between the eNBs 104.

With cellular networks, LP cells may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, such as the LTE unlicensed band, or may operate on different frequency bands with each cell operating in a different frequency band or only cells of different sizes operating on different frequency bands. As used herein, the term low power (LP) eNB refers to any suitable relatively low power eNB for implementing a narrower cell (narrower than a macro cell) such as a femtocell, a picocell, or a microcell. Femtocell eNBs may be typically provided by a mobile network operator to its residential or enterprise customers. A femtocell may be typically the size of a residential gateway or smaller and generally connect to a broadband line. The femtocell may connect to the mobile operator's mobile network and provide extra coverage in a range of typically 30 to 50 meters. Thus, a LP eNB might be a femtocell eNB since it is coupled through the PDN GW 126. Similarly, a picocell may be a wireless communication system typically covering a small area, such as in-building (offices, shopping malls, train stations, etc.), or more recently in-aircraft. A picocell eNB may generally connect through the X2 link to another eNB such as a macro eNB through its base station controller (BSC) functionality. Thus, LP eNB may be implemented with a picocell eNB since it may be coupled to a macro eNB via an X2 interface. Picocell eNBs or other LP eNBs may incorporate some or all functionality of a macro eNB. In some cases, this may be referred to as an access point base station or enterprise femtocell.

Communication over an LTE network may be split up into 10 ms frames, each of which may contain ten 1 ms subframes. Each subframe of the frame, in turn, may contain two slots of 0.5 ms. Each subframe may be used for uplink communications from the UE to the eNB or downlink communications from the eNB to the UE. In one embodiment, the eNB may allocate a greater number of downlink communications than uplink communications in a particular frame. The eNB may schedule transmissions over a variety of frequency bands ($f_1$ and $f_2$). The allocation of resources in subframes used in one frequency band and may differ from those in another frequency band. Each slot of the subframe may contain 6-7 symbols, depending on the system used. In one embodiment, the subframe may contain 12 subcarriers.

A downlink resource grid may be used for downlink transmissions from an eNB to a UE, while an uplink resource grid may be used for uplink transmissions from a UE to an eNB or from a UE to another UE. The resource grid may be a time-frequency grid, which is the physical resource in the downlink in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block, dependent on the system bandwidth. In Frequency Division Duplexed (FDD) mode, both the uplink and downlink frames may be 10 ms and frequency (full-duplex) or time (half-duplex) separated. In Time Division Duplexed (TDD), the uplink and downlink subframes may be transmitted on the same frequency and are multiplexed in the time domain. The duration of the resource grid in the time domain corresponds to one subframe or two resource blocks. Each resource grid may comprise 12 (subcarriers) *14 (symbols)=168 resource elements.

There may be several different physical downlink channels that are conveyed using such resource blocks, including the physical downlink control channel (PDCCH) and the physical downlink shared channel (PDSCH). Each subframe may contain a PDCCH, physical hybrid-ARQ indicator channel (PHICH), physical control format indicator channel (PCFICH) and the PDSCH. The PDCCH may normally occupy the first up to three symbols (four in the case of narrow bandwidths of 1.4 MHz) of each subframe and carry, among other things, information about the transport format and resource allocations related to the PDSCH channel and uplink scheduling grants for a physical uplink shared channel (PUSCH) transmission. The PHICH may be used to signal HARQ information in response to a PUSCH transmission. The PCFICH may inform the UE the control region size (e.g. one, two or three OFDM symbols) in each downlink subframe. The PDSCH may carry user data and higher layer signaling to a particular UE and occupy the remainder of the downlink subframe to avoid the resources in which downlink control channels (PDCCH/PHICH/PCFICH) are transmitted. Typically, downlink scheduling (assigning control and shared channel resource blocks to UEs within a cell) may be performed at the eNB based on channel quality information provided by the UEs, and then the downlink resource assignment information may be sent to a scheduled UE on the PDCCH used for (assigned to) PDSCH reception of the UE.

The PDCCH may contain downlink control information (DCI) in one of a number of formats that tell the UE where to find and how to decode the data, transmitted on PDSCH in the same subframe, from the resource grid. The DCI may provide details such as the number of resource blocks, resource allocation type, modulation scheme, transport block, redundancy version, coding rate etc. Each DCI format may have a cyclic redundancy code (CRC) and be scrambled with a Radio Network Temporary Identifier (RNTI) that identifies the target UE for which the PDSCH is intended. Use of the RNTI, which may be UE-specific, may limit decoding of the DCI information (and hence the corresponding PDSCH) to only the intended UE. The PDCCH may be located in any of a number of frequency/temporal regions, depending on whether the PDCCH is UE-Specific or common, as well as the aggregation level. The set of possible candidate locations for the PDCCH is defined in terms of search spaces. A search space is defined by a set of Control Channel Element (CCE) candidates with a number of aggregation level L∈{1,2,4,8} where the UE may monitor to find its PDCCHs. A common search space may carry DCIs that are common for all UEs; for example, system information (using the SI-RNTI), paging (P-RNTI), PRACH responses (RA-RNTI), or UL TPC commands (TPC-PUCCH/PUSCH-RNTI). A UE-specific search space may carry DCIs for UE-specific allocations using a Cell Radio-Network Temporary Identifier (C-RNTI) assigned to the UE, a semi-persistent scheduling (SPS C-RNTI), or an initial allocation (temporary C-RNTI). When configuring an SPS (either uplink or downlink), the SPS C-RNTI is provided by the eNB and the UE is configured by higher layers to decode a PDCCH with a CRC scrambled by the SPS C-RNTI. The UE may monitor the PDCCH having a CRC scrambled by the SPS C-RNTI in every subframe as the eNB can activate/re-activate/release the SPS at any time using a DCI format with a CRC scrambled by an SPS C-RNTI. The received DCI format with a CRC scrambled by the SPS C-RNTI can be a grant/assignment for a retransmission or for activation/re-activation/release of the SPS. 3GPP Technical Specification 36.213 has tabulated the validation procedure for activation/re-activation/release of SPS.

In addition to the PDCCH, an enhanced PDCCH (EPD-CCH) may be used by the eNB and UE. The PDSCH may thus contain data in some of the resource blocks (RBs) and then EPDCCH contains the downlink control signals in others of the RBs of the bandwidth supported by the UE. Different UEs may have different EPDCCH configurations. The sets of RBs corresponding to EPDCCH may be configured, for example, by higher layer signaling such as Radio Resource Control (RRC) signaling for EPDCCH monitoring.

The Physical Uplink Control Channel (PUCCH) may be used by the UE to send Uplink Control Information (UCI) to the eNB. The PUCCH may be mapped to an UL control channel resource defined by an orthogonal cover code and two resource blocks (RBs), consecutive in time, with hopping potentially at the boundary between adjacent slots. The PUCCH may take several different formats, with the UCI containing information dependent on the format. Specifically, the PUCCH may contain a scheduling request (SR), acknowledgement responses/retransmission requests (ACK/NACK) or a Channel Quality Indication (CQI)/Channel State Information (CSI). The CQI/CSI may indicate to the eNB an estimate of the current downlink channel conditions as seen by the UE to aid channel-dependent scheduling and, if one MIMO transmission mode is configured to the UE, may include MIMO-related feedback (e.g. Precoder matrix indication, PMI).

In order to enable retransmission of missing or erroneous data unites, the Hybrid Automatic Repeat Request (HARM) scheme may be used to provide the feedback on success or failure of the decoding attempt to the transmitter after each received data block. When an eNB sends PDSCH data in a downlink transmission to the UE, the data packets may be sent together with indicators in a PDCCH in the same subframe that inform the UE about the scheduling of the PDSCH, including the transmission time and other scheduling information of the transmitted data. For each PDSCH codeword that the UE receives, the UE may respond with an ACK when the codeword is successfully decoded, or a NACK when the codeword is not successfully decoded. The eNB may expect the ACK/NACK feedback after a predetermined number of subframes from the subframe in which the PDSCH data is sent. Upon receiving a NACK from the UE, the eNB may retransmit the transport block or skip the retransmission if the retransmission number exceeds a maximum value. The ACK/NACK for the corresponding the PDSCH may be transmitted by the UE four subframes after the PDSCH is received from the eNB. Depending on the number of codewords present, HARQ-ACK information corresponding to a PDSCH may contain, for example, 1 or 2 information bits (DCI formats 1a and 1b, respectively). The HARQ-ACK bits may then be processed, as per the PUCCH.

A scheduling request (SR) may permit the UE to request uplink resources for Physical Uplink Shared Channel (PUSCH). In some embodiments, no information bits are transmitted by the UE to request uplink resources to transmit PUSCH. The eNB may know, however, the timing of when to expect a scheduling request from each UE within the cell as the resources used for SR transmission for a given UE is assigned by eNB, occurring every several subframes. Thus, if PUCCH energy is detected, the eNB may identify it as a scheduling request from the corresponding UE. PUCCH formats 1, 1a, and 1b may use four SC-FDMA symbols of seven OFDM symbols per slot to transmit HARQ-ACK information bits using a normal cyclic prefix (CP) and may be modulated respectfully using binary phase shift keying (BPSK) and quadrature phase shift keying (QPSK). If a normal CP is used, the remaining 3 symbols may be used for a PUCCH demodulation reference signal (DM-RS). If a sounding reference signal (SRS) overlaps the PUCCH symbols, only three symbols of the seven OFDM symbols may be used for HARQ-ACK information bits transmission in the second slot of the subframe. DM-RS symbols may be used by the eNB to perform channel estimation and allow for coherent demodulation of the received signal. The DM-RS symbols may be essentially pilot symbols in LTE, used for channel estimation for the demodulation of the data symbols of the subframe.

Figure 2:
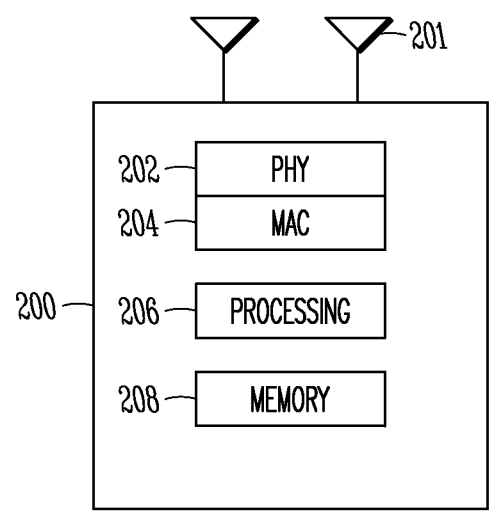
FIG. 2 illustrates a functional block diagram of a communication device in accordance with some embodiments.

FIG. 2 illustrates a functional block diagram of a communication device (e.g., an UE or eNB) in accordance with some embodiments. The communication device 200 may include physical layer (PHY) circuitry 202 for transmitting and receiving radio frequency electrical signals to and from the communication device, other eNBs, other UEs or other devices using one or more antennas 201 electrically connected to the PHY circuitry. The PHY circuitry 202 may include circuitry for modulation/demodulation, upconversion/downconversion, filtering, amplification, etc. Communication device 200 may also include medium access control layer (MAC) circuitry 204 for controlling access to the wireless medium and to configure frames or packets for communicating over the wireless medium. The communication device 200 may also include processing circuitry 206 and memory 208 arranged to configure the various elements of the cellular device to perform the operations described herein. The memory 208 may be used to store information for configuring the processing circuitry 206 to perform the operations. In some embodiments, the physical layer (PHY) circuitry 202 may contain a transceiver connected with and controlled by the processing circuitry 206.

In some embodiments, the communication device 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable device, a sensor, or other device that may receive and/or transmit information wirelessly. In some embodiments, the communication device 200 may include one or more of a keyboard, a display, a non-volatile memory port, multiple antennas, a graphics processor, an application processor, speakers, and other mobile device elements. The display may be an LCD screen including a touch screen.

The one or more antennas 201 utilized by the communication device 200 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and different channel characteristics that may result between each of the antennas of a receiving station and each of the antennas of a transmitting station. In some MIMO embodiments, the antennas may be separated by up to $\frac{1}{10}$ of a wavelength or more.

Although the communication device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

The embodiments described may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the processing circuitry 206 may be configured to receive OFDM communication signals over a multicarrier communication channel in accordance with an OFDMA communication technique. The OFDM signals may comprise a plurality of orthogonal subcarriers. In some broadband multicarrier embodiments, the cellular device 200 may operate as part of a broadband wireless access (BWA) network communication network, such as a Worldwide Interoperability for Microwave Access (WiMAX) communication network or a $3^{rd}$ Generation Partnership Project (3GPP) Universal Terrestrial Radio Access Network (UTRAN) or a LTE communication network, an LTE-Advanced communication network, a fifth generation (5G) or later LTE communication network or a high speed downlink/uplink access (HSDPA/HSUPA) communication network, although the scope of the invention is not limited in this respect.

Carrier aggregation, until recently, has been limited by 3GPP specification to aggregate up to five component carriers, which has been increased to thirty two in 3GPP Release 13 to effect enhanced carrier aggregation. One issue in support the enhanced carrier aggregation with up to 32 CCs involves design of uplink transmissions to avoid unnecessary performance loss of a PUSCH transmission due to a huge amount of redundant HARQ-ACK information bits on the PUSCH. In more detail, the UCI may be transmitted using the PUCCH, but sometimes may be piggybacked using the PUSCH instead of PUCCH for a particular type of UE, e.g. when the PUSCH is to be transmitted in an uplink subframe and the UE is incapable of simultaneous PUCCH and PUSCH transmission. When the UCI is transmitted on the PUSCH, the Channel Quality Indicator (CQI) and Precoding Matrix Indicator (PMI), which indicate the channel quality, may be transmitted at the beginning of uplink shared channel (UL-SCH) data resources and mapped sequentially to all single-carrier frequency division multiple access (SC-FDMA) symbols on one subcarrier before continuing on the next subcarrier. The UL-SCH data is rate-matched around the CQI/PMI data. However, the HARQ-ACK information bits/symbols are mapped to SC-FDMA symbols by puncturing the mapped PUSCH data resource elements (REs), which may degrade the PUSCH performance once it presents.

In recent 3GPP LTE releases, the HARQ-ACK codebook size may be determined by the number and transmission mode of configured serving cells (also referred to as component carriers (CC)) and the number of downlink subframes in the bundled window (i.e. containing multiple subframe(s) associated with a particular uplink frame that carry the corresponding HARQ-ACK information bits). The HARQ-ACK codebook may include a number of HARQ-ACK bits equal to the number of configured serving cells multiplied by the number of transport blocks, which may thus contain redundant HARQ-ACK bits information in some cases as explained following. The existing HARQ-ACK codebook size determination method may not be able to minimize the HARQ-ACK overhead with the increased CC numbers, especially in circumstances in which the enhanced Node-B (eNB) only schedules a small portion of configured serving cells for LAA PDSCH transmission due to the opportunistic nature of the LAA communications.

Due to the excessive overhead when a large amount of carrier aggregation is used in the system (e.g., greater than 10-15 carrier components or serving cells), it may be desirable to minimize the HARQ-ACK payload size on the PUSCH while maintaining HARQ-ACK performance when the UE is configured with massive serving cells on unlicensed spectrum. A new mechanism may thus be employed to reduce the size of the HARQ-ACK bits, as well as ordering the HARQ-ACK bits to avoid ambiguity in the association between the HARQ-ACK bits and corresponding component carriers/transport blocks. To this end, in some embodiments a new field may be added to legacy DCI formats used for PUSCH and PDSCH scheduling in both Frequency Division Duplexing (FDD) and Time Division Duplexing (TDD) communications. As used herein, legacy DCI formats are formats used in 3GPP Release 12 (or earlier) systems. Relying on new information elements (IEs) in 3GPP Rel-13 DCI formats, a new HARQ-ACK bits determination and mapping method may be used to address the overhead issue with HARQ-ACK bits on the PUSCH when a large amount of carrier aggregation is configured for a particular UE.

Figure 3:
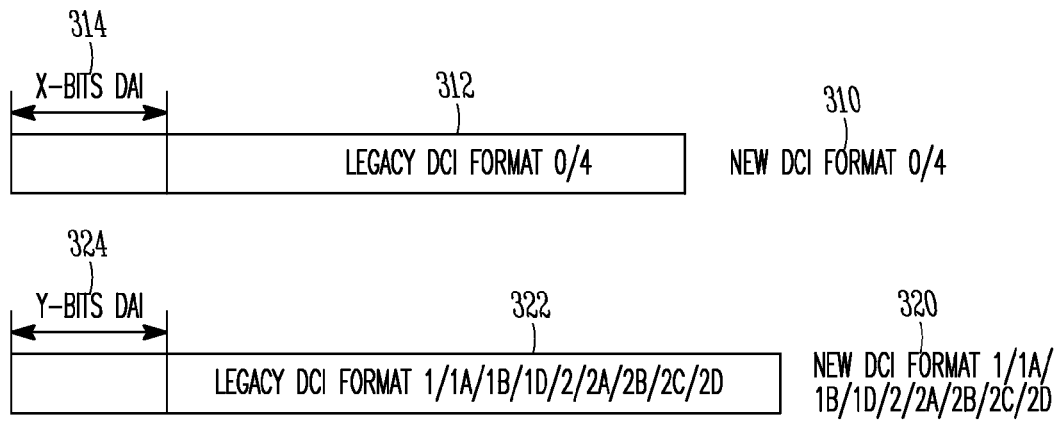
FIG. 3 shows Frequency Division Duplexed (FDD) legacy Downlink Control information (DCI) format adjustments according to some embodiments.

For FDD communications, as indicated above, the UE may receive a PDSCH or PDCCH transmission indicating a downlink SPS release in subframe n−4 that is intended for the UE (on the UE specific search space given by the C-RNTI). In response, the UE may transmit an ACK/NACK in the uplink subframe n, four subframes later. FIG. 3 shows FDD legacy DCI format adjustments according to some embodiments. In particular, FIG. 3 shows modifications (in this case additions) to legacy DCI formats 0/4 312 and legacy DCI formats 1/1A/1B/1D/2/2A/2B/2C/2D 322 to form new DCI formats. In particular, different IEs, referred to herein as Downlink Assignment Indexes (DAI) 314, 324, may be respectively added to the legacy DCI formats 312, 322 to form the new DCI formats 310, 320. This may minimize the payload size of the HARQ-ACK bits when the UE transmits HARQ-ACK information bits on the PUSCH, adjusted based on a detected PDCCH with one of the DCI formats intended for the UE and the UE is configured with more than one serving cell.

As shown in FIG. 3, the DAI field 314 for DCI formats 0/4 may contain X bits for FDD operation. In some embodiments, X may be 2, 3 or 4, representing a balance between adding additional overhead to the control signaling and reducing the probability that the UE falsely derived the total number of HARQ-ACK bits. As above, the DAI field 314 may be limited to DCI format 0/4, mapped onto the UE specific search space given by the CRC parity bits scrambled with the C-RNTI. The value of the DAI in DCI format 0/4, $V_{DAI}^{UL}$, may be determined by the UE according to Table 1 (for a 2-bit DAI), Table 2 (for a 3-bit DAI) and Table 3 (for a 4-bit DAI), in subframe n−4.

TABLE 1

Value of 2-bit Downlink Assignment Index

| DAI MSB, LSB $V_{DAI}^{UL}$ or $V_{DAI}^{DL}$ | | Number of subframes/ CCs with PDSCH transmission and with PDCCH indicating DL SPS release |
|---|---|---|
| 0, 0 | 1 | 1 or 5 or 9 or 13 or 17 or 21 or 25 or 29 |
| 0, 1 | 2 | 2 or 6 or 10 or 14 or 18 or 22 or 26 or 30 |
| 1, 0 | 3 | 3 or 7 or 11 or 15 or 19 or 23 or 27 or 31 |
| 1, 1 | 4 | 0/4 or 8 or 12 or 16 or 20 or 24 or 28 or 32 |

TABLE 2

Value of 3-bit Downlink Assignment Index

| DAI MSB, LSB $V_{DAI}^{UL}$ or $V_{DAI}^{DL}$ | | Number of subframes/ CCs with PDSCH transmission and with PDCCH indicating DL SPS release |
|---|---|---|
| 0, 0, 0 | 1 | 1 or 9 or 17 or 25 |
| 0, 0, 1 | 2 | 2 or 10 or 18 or 26 |
| 0, 1, 0 | 3 | 3 or 11 or 19 or 27 |
| 0, 1, 1 | 4 | 4 or 12 or 20 or 28 |
| 1, 0, 0 | 5 | 5 or 13 or 21 or 29 |
| 1, 0, 1 | 6 | 6 or 14 or 22 or 30 |
| 1, 1, 0 | 7 | 7 or 15 or 23 or 31 |
| 1, 1, 1 | 8 | 0 or 8 or 16 or 24 or 32 |

TABLE 3

Value of 4-bit Downlink Assignment Index

| DAI MSB, LSB $V_{DAI}^{UL}$ or $V_{DAI}^{DL}$ | | Number of subframes/ CCs with PDSCH transmission and with PDCCH indicating DL SPS release |
|---|---|---|
| 0, 0, 0, 0 | 1 | 1 or 17 |
| 0, 0, 0, 1 | 2 | 2 or 18 |
| 0, 0, 1, 0 | 3 | 3 or 19 |
| 0, 0, 1, 1 | 4 | 4 or 20 |
| 0, 1, 0, 0 | 5 | 5 or 21 |
| 0, 1, 0, 1 | 6 | 6 or 22 |
| 0, 1, 1, 0 | 7 | 7 or 23 |
| 0, 1, 1, 1 | 8 | 8 or 24 |
| 1, 0, 0, 0 | 9 | 9 or 25 |
| 1, 0, 0, 1 | 10 | 10 or 26 |
| 1, 0, 1, 0 | 11 | 11 or 27 |
| 1, 0, 1, 1 | 12 | 12 or 28 |
| 1, 1, 0, 0 | 13 | 13 or 29 |
| 1, 1, 0, 1 | 14 | 14 or 30 |
| 1, 1, 1, 0 | 15 | 15 or 31 |
| 1, 1, 1, 1 | 16 | 0 or 16 or 32 |

The DCI format 0/4 value DAI, $V_{DAI}^{UL}$, may represent the total number of serving cells or CCs with PDSCH transmissions and with a PDCCH/EPDCCH transmission indicating a downlink SPS release to the corresponding UE in subframe n−4. In some embodiments, the DCI format 0/4 value DAI may indicate the number of subframes containing a PDSCH transmission and PDCCH transmission indicating a downlink SPS release across all serving cells. As shown in Table 1, for example, for a carrier aggregation of 32 CCs, each 2-bit DCI format 0/4 value may indicate one of 8 possible subframe/CC numbers with a PDSCH transmission and with PDCCH indicating a downlink SPS release, so that a DCI format 0/4 value of i (where i is one of the 4 possible 2-bit values) may indicate one of i+4m subframes/CCs with a PDSCH transmission and with PDCCH indicating a downlink SPS release, where m is an integer between 0-7. Similarly, as shown in Table 2, each 3-bit DCI format 0/4 value may indicate one of 3 possible subframe/CC numbers with PDSCH transmission and with PDCCH indicating a downlink SPS release, so that a DCI format 0/4 value of i (where i is one of the 8 possible 3-bit values) may indicate i+8m subframes/CCs with a PDSCH transmission and with PDCCH indicating a downlink SPS release, where m is an integer between 0-3. As shown in Table 3, each 4-bit DCI format 0/4 value may indicate one of 2 possible subframe/CC numbers with a PDSCH transmission and with a PDCCH indicating a downlink SPS release, so that a DCI format 0/4 value of i (where i is one of the 16 possible 4-bit values) may indicate i+16m subframes/CCs with a PDSCH transmission and with a PDCCH indicating a downlink SPS release, where m is an integer between 0-1. The value of DAI field in a DCI format 0/4 may thus include all PDSCH transmissions (i.e., those with and without a corresponding PDCCH transmission) within the configured serving cells in subframe n−4. In some embodiments, as shown in Tables 2-4, if neither a PDSCH transmission, nor a PDCCH transmission indicating the downlink SPS resource release is intended for the UE, the UE may be able to expect that the value of the DAI in DCI format 0/4, $V_{DAI}^{UL}$, if transmitted, is set to 4 if a 2-bit DAI is used, set to 8 if 3-bit DAI is used, or set to 16 if 4-bit DAI is used.

The DAI field 324 for DCI formats 1/1A/1B/1D/2/2A/2B/2C/2D may contain Y bits for FDD operation, where Y may be the same as or different from X. Similar to the DAI field 314, the DAI field 324 may be limited to DCI formats scheduling a PDSCH that are mapped onto the UE specific search space given by the C-RNTI. The value of the DAI in DCI formats 1/1A/1B/1D/2/2A/2B/2C/2D, $V_{DAI,k}^{DL}$, may indicate an accumulative number of PDCCH/EPDCCH(s) with assigned PDSCH transmission(s) and PDCCH/EPDCCH(s) indicating downlink SPS release in the serving cells in subframe n–4. This value may be updated from serving cell to serving cell in subframe n–4.

When a received $V_{DAI,k}^{DL}$ in serving cell k is smaller than an earlier received $V_{DAI,i}^{DL}$ in serving cell i, where i<k, the UE may calculate the associated DAI value as: DAI=$V_{DAI}^{DL}$+$2^Y$; otherwise, the UE calculate DAI as: DAI=$V_{DAI}^{DL}$, where Y is the number of bits of the DAI field 324 and $V_{DAI}^{DL}$ is determined based on 2/3/4-bit DAI field in DCI formats respectively according to Table 1/2/3. $N_{SPS}$, which can be zero or one, may be the number of PDSCH transmissions without a corresponding PDCCH in subframe n–4. This may be updated from serving cell to serving cell.

Figure 4:
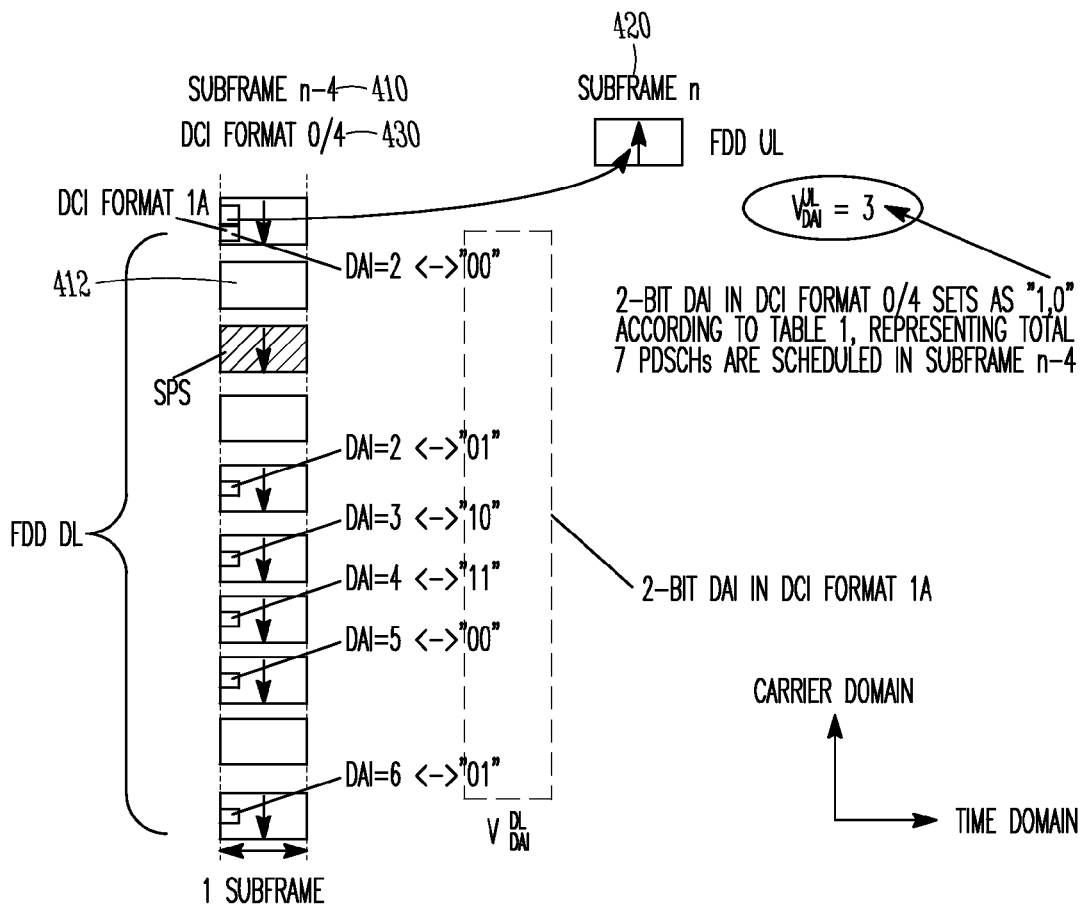
FIG. 4 illustrates Downlink Assignment Index (DAI) field usage in DCI formats according to some embodiments.

FIG. 4 illustrates DAI field usage in DCI formats according to some embodiments. In FIG. 4, a 2-bit DAI field setting in the DCI format 0/4 430 and DCI format 1A 440 is shown, assuming the eNB serving the UE schedules seven PDSCH transmissions in subframe n–4 410 for a given UE in the ten serving cells (i.e. carriers) 412, which includes one SPS PDSCH. The arrow in subframe n–4 indicates that the CC carries a downlink transmission. As can be seen the PDSCH transmissions are scheduled in CCs 1, 3 (the SPS), 5, 6, 7, 8 and 10. The DAI value in DCI formats used for scheduling the PDSCH in subframe n–4 may be accumulated starting from 0 in ascending order of the downlink CC that has PDSCH scheduling. Following this rule, the DAI value in CC 1 is 00, in CC5 is 01 (skipping the CC that contains the SPS PDSCH transmission), in CC 6 is 10, in CC 7 is 11, in CC 7 is 00 and in CC 10 is 01. As above, the DAI value resets after the fourth CC as only four DAI values are available for a 2-bit DAI field. In some embodiments, because seven PDSCH transmissions are scheduled in subframe n–4 410, the value of the DAI in DCI format 0/4, $V_{DAI}^{UL}$, from Table 1 is 3 due to the limitation of 2-bit DAI field size.

In some embodiments, if the PUSCH transmission in subframe n 420 is adjusted based on a detected PDCCH with DCI format 0/4 intended for the UE in subframe n–4 410, the HARQ-ACK bits may be constructed for the PUSCH in subframe n 420 using several different pieces of information. In some embodiments, this may include ordering of the configured serving cells. The configured serving cell may be ordered, for example, from 1 to C based on the value of the cell ID, assuming a given UE is configured with C serving cells. The value of the DAI in DCI format 1/1A/1B/1D/2/2A/2B/2C/2D $V_{DAI,k}^{DL}$, may indicate the accumulated number of EPDCCH transmissions up to the present serving cell k within the configured serving cells and may be updated from serving cell to serving cell. As shown in FIG. 4, the value of the DAI in DCI formats 1/1A/1B/1D/2/2A/2B/2C/2D, $V_{DAI}^{DL}$, may thus be 6 (seven less the SPS CC).

The UE may perform spatial HARQ-ACK bundling across multiple codewords within a downlink subframe by a logical AND operation of all corresponding individual HARQ-ACKs. The total number of HARQ-ACK bits $O^{ACK}$ may be calculated in some embodiments as follows:

$$O^{ACK}=W_{DAI}^{UL}+N\lceil(U-W_{DAI}^{UL})/N\rceil \quad (1)$$

where:

U denotes the total number of received PDSCH(s) and PDCCH transmission indicating a downlink SPS release detected by the UE in subframe n–4 across all serving cells.

$W_{DAI}^{UL}$ is determined by the DAI in DCI format 0/4 according to Table 4 in subframe n–4 corresponding to different bits number of DAI field.

N=4, 8 or 16 respectively corresponding to a 2-bit, 3-bit, or 4-bit DAI field.

⌈ ⌉ is a ceiling operator

TABLE 4

Value of $W_{DAI}^{UL}$ determined by the 2/3/4-bit DAI field in DCI format 0/4

| DAI MSB, LSB | $W_{DAI}^{UL}$ | DAI MSB, LSB | $W_{DAI}^{UL}$ | DAI MSB, LSB | $W_{DAI}^{UL}$ |
|---|---|---|---|---|---|
| 0,0 | 1 | 0,0,0 | 1 | 0,0,0,0 | 1 |
| 0,1 | 2 | 0,0,1 | 2 | 0,0,0,1 | 2 |
| 1,0 | 3 | 0,1,0 | 3 | 0,0,1,0 | 3 |
| 1,1 | 4 | 0,1,1 | 4 | 0,0,1,1 | 4 |
| | | 1,0,0 | 5 | 0,1,0,0 | 5 |
| 2-bits | | 1,0,1 | 6 | 0,1,0,1 | 6 |
| | | 1,1,0 | 7 | 0,1,1,0 | 7 |
| | | 1,1,1 | 8 | 0,1,1,1 | 8 |
| | | 3-bits | | 1,0,0,0 | 9 |
| | | | | 1,0,0,1 | 10 |
| | | | | 1,0,1,0 | 11 |
| | | | | 1,0,1,1 | 12 |
| | | | | 1,1,0,0 | 13 |
| | | | | 1,1,0,1 | 14 |
| | | | | 1,1,1,0 | 15 |
| | | | | 1,1,1,1 | 16 |
| | | | | 4-bits | |

The UE may not transmit a HARQ-ACK signal on a PUSCH if the UE does not receive a PDSCH or PDCCH transmission indicating a downlink SPS release in subframe n–4. Thus, in some embodiments, the UE may transmit a HARQ-ACK signal on a PUSCH only if the UE receives a PDSCH or PDCCH transmission indicating a downlink SPS release in subframe n–4. Similar to the above, $W_{DAI}^{UL}$=4, 8 or 16 corresponds to 2/3/4-bit DAI in DCI format 0/4.

The ordering of the HARQ-ACK bits may also be determined by the UE. A spatially bundled HARQ-ACK for a PDSCH with a corresponding PDCCH or for a PDCCH indicating a downlink SPS release in subframe n–4 may be associated with $O_{B(k)-1}^{ACK}$ where B(k) is derived based on the DAI value $V_{DAI,k}^{DL}$ in DCI format 1/1A/1B/1D/2/2A/2B/2C/2D detected in subframe n–4 in the k-th serving cell as specified in Table 1, 2 or 3 in subframe n–4.

$$B(k)=V_{DAI,k}^{DL}+N\lceil(U_k-V_{DAI,k}^{DL}/N\rceil \quad (2)$$

where $U_k$ denotes the total number of received PDSCH(s) and PDCCH transmissions indicating a downlink SPS release detected by the UE in subframe n–4 across serving cells 1, 2, . . . k and ⌈ ⌉ is a ceiling operator. The definition of N may be same as above.

When the number of downlink SPS releases is not zero (i.e., $N_{SPS}$>0), the HARQ-ACK associated with a PDSCH without a corresponding PDCCH may be mapped to $O_{O^{ACK}-1}^{ACK}$. HARQ-ACK bits without any detected PDSCH transmission or without a detected PDCCH indicating a downlink SPS release may be set to NACK.

Figure 5:
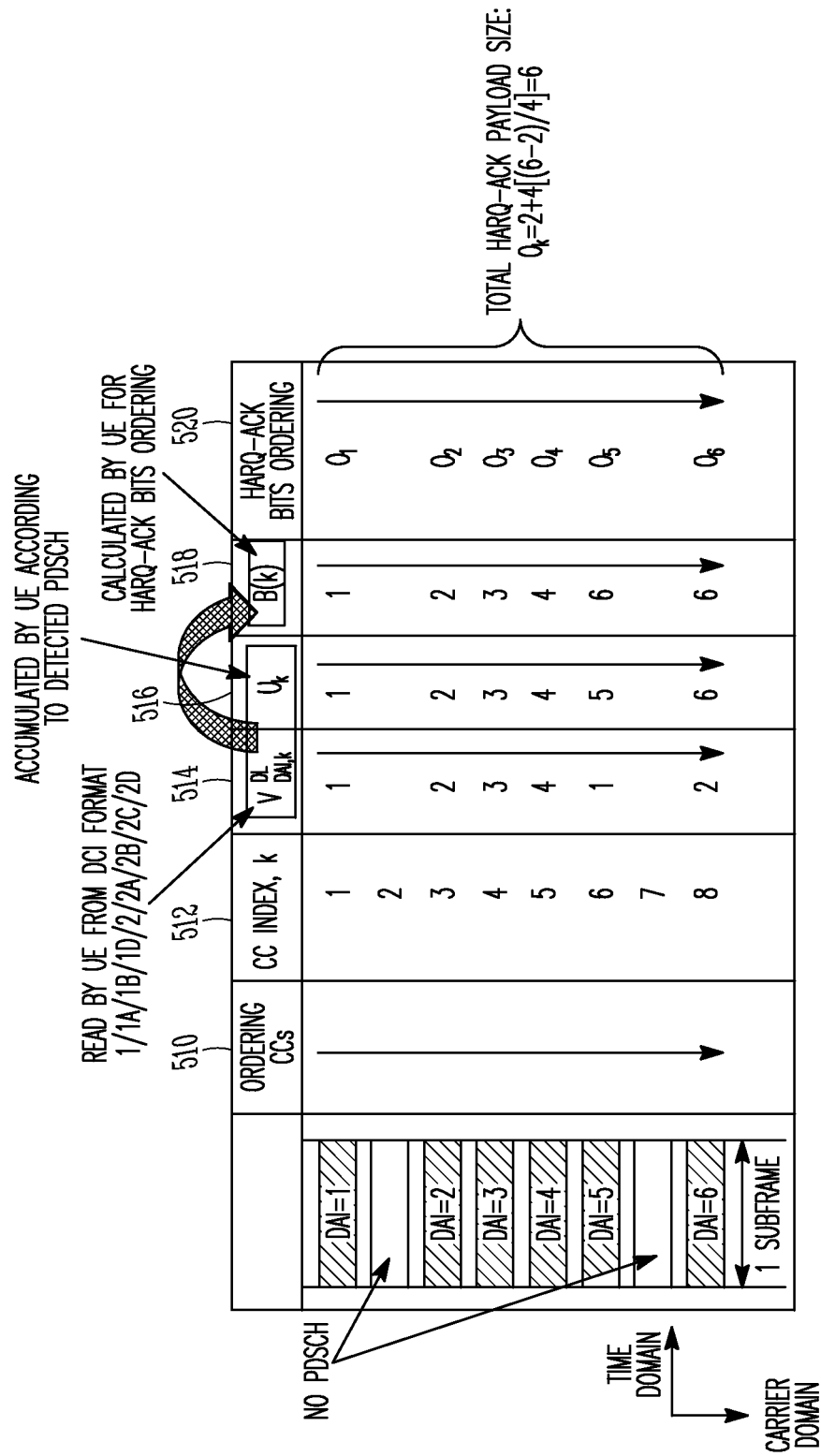
FIG. 5 illustrates a HARQ-ACK construction using Downlink Assignment Index (DAI) fields according to some embodiments.

FIG. 5 illustrates a HARQ-ACK construction using DAI fields according to some embodiments. In the subframe shown in FIG. 5, up to 8 CCs 510 may be aggregated for PDSCH transmission for a given UE in a FDD system, with the CCs having a CC index 512 ranging from 1-8. As shown, the UE is scheduled with a PDSCH transmission in all CCs 510 except CC 2 and CC7, and thus 6 DAIs are associated with the CCs having a PDSCH transmission 510. The DAI value $V_{DAI,k}^{DL}$ 514 in DCI format 1/1A/1B/1D/2/2A/2B/2C/2D, again assuming a 2-bit DAI field, for the CCs 510 containing a PDSCH transmission runs from 1-4 before repeating. The accumulative value, $U_k$, 516 and B(k) value 518 each runs from 1-6 with increasing CCs 510 containing a PDSCH transmission assuming all PDSCH transmitted by the eNB is detected at the UE. The total HARQ-ACK bits number $O^{ACK}$ may then be calculated from equation (1) as $O^{ACK}=6$. The UE may thus construct a total of 6 HARQ-ACK bits with a particular order based on B(k) to transmit over PUSCH.

Figure 6:
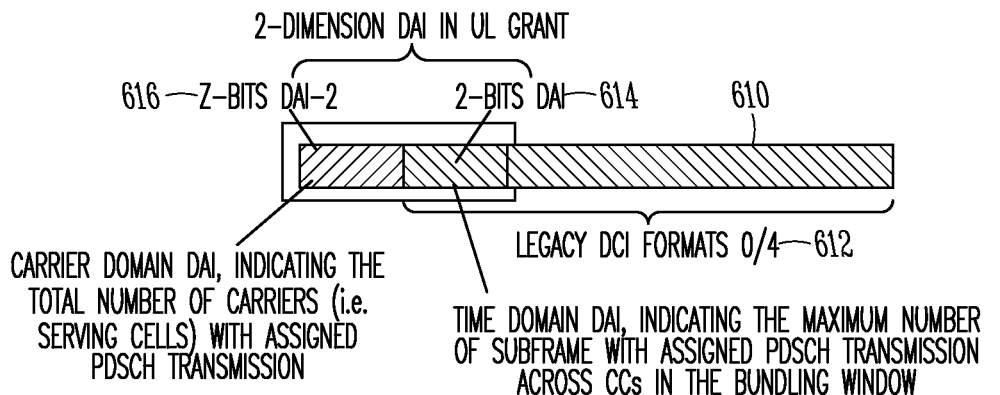
FIG. 6 shows Time Division Duplexed (TDD) legacy DCI format adjustments according to some embodiments.
Figure 6:
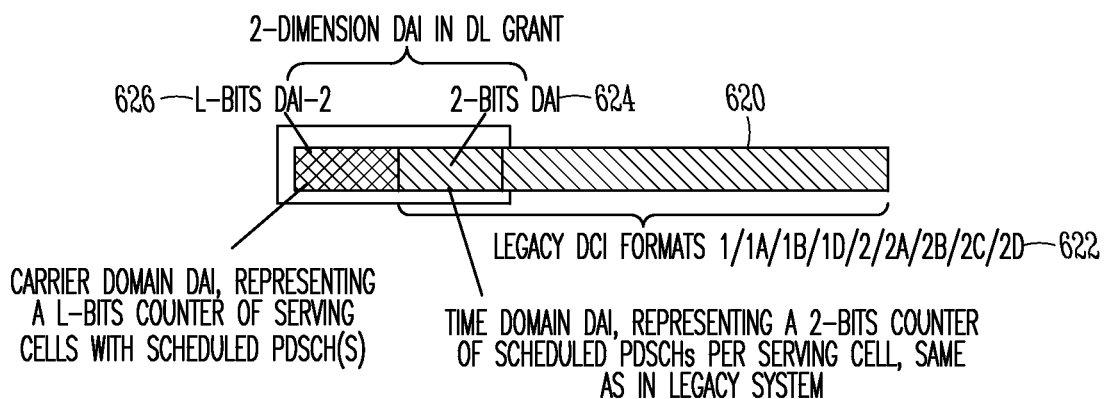

While the above description focused on FDD systems, a similar mechanism may be used for TDD systems. FIG. 6 shows TDD legacy DCI format adjustments according to some embodiments. Constructing reduced overhead HARQ-ACK responses in TDD systems using carrier aggregation with a large amount of CCs may be achieved in a similar manner as above for FDD system. Thus, in some embodiments, to form the new uplink DCI format 0/4 610 a new Z bit field 616 of a CC-specific DAI (also referred to as DAI-2 field) may be added to the legacy Rel-13 DCI format 0/4 612 for TDD operation in a manner similar to the above. The legacy Rel-13 DCI format 0/4 612 for TDD operation may also contain a DAI 614 of length 2-bits whose value may represent the total number of subframes containing PDSCH transmissions assigned to the UE across all of the CCs in the bundling window. Herein, a bundling window may comprise a number of downlink subframes associated with a single uplink subframe for HARQ-ACK feedback according to a predefined HARQ timing relationship for PDSCH transmission. In some embodiments, the length of the DAI-2 DCI format 0/4 field 616 may be 2 bits. As above, the DAI-2 field 616 may be present in DCI format 0/4, which is mapped onto the UE specific search space given by CRC bits scrambled by the C-RNTI. In some embodiments, X=Z to maximize the commonality between FDD and TDD system solutions. The value of the DAI-2 DCI format 0/4 field 616 may represent the total number of serving cells (i.e., carriers) with PDSCH transmissions and with PDCCH/EPDCCH transmissions indicating a downlink SPS release to the corresponding UE within the associated subframes n−k in a bundling window, where k ∈ K and K is defined in Table 5. The DAI field 614 in DCI format 0/4 and DAI-2 field 616 in DCI format 0/4 may be encoded separately to present different meanings but when combined may provide uplink information about both the subframes and the CCs containing PDSCH transmissions.

TABLE 5

| Downlink association set index K: {k₀, k₁, ... k_{M−1}} for TDD | | | | | | | | | | |
|---|---|---|---|---|---|---|---|---|---|---|
| UL-DL | Subframe n | | | | | | | | | |
| Configuration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In a manner similar to the above, a new L-bit DAI-2 field 626 may be added to the legacy DCI format 1/1A/1B/1D/2/2A/2B/2C/2D 622 to form a new downlink DCI format 1/1A/1B/1D/2/2A/2B/2C/2D 620 in the TDD system. In some embodiments, the length of the L-bit DAI-2 field in the DCI format 1/1A/1B/1D/2/2A/2B/2C/2D 626 may be 2 bits. The UE may not be expected to receive DCI format 1/1A/1B/1D/2/2A/2B/2C/2D with different DAI-2 values in any subframe for a given serving cell. The DAI-2 field 626 correspondingly may be present in the DCI format used for scheduling a PDSCH transmission (e.g. DCI format 1/1A/1B/1D/2/2A/2B/2C/2D) and is mapped to the UE specific search space given by the CRC bits scrambled by the C-RNTI. The value of the DAI-2 DCI field 626 in the new DCI format 1/1A/1B/1D/2/2A/2B/2C/2D 620 may indicate the accumulative number of serving cells providing a PDCCH/EPDCCH(s) transmission with assigned a PDSCH transmission(s) and a PDCCH/EPDCCH transmission indicating a downlink SPS release across all the configured serving cells. The DAI-2 field 626 values in one of DCI format 1/1A/1B/1D/2/2A/2B/2C/2D may be updated from serving cell to serving cell. The legacy Rel-13 DCI format 1/1A/1B/1D/2/2A/2B/2C/2D 622 for TDD operation may also contain a legacy DAI 624 of length 2-bits, whose value may represent the accumulative number of scheduled PDSCH transmissions within a bundling window assigned to the UE per each serving cell. As above, the DAI field 624 and DAI-2 field 626 in new DCI format 1/1A/1B/1D/2/2A/2B/2C/2D may be encoded separately to present different meanings but when combined provide downlink information about both the subframes and the CCs containing PDSCH transmissions.

The total HARQ-ACK bits number $O^{ACK}$ may, in some embodiments, be calculated as follows:

$$O^{ACK}=B_1 \times B_2 \qquad (3)$$

$$B_1=W_{DAI,2}^{UL}+N\lceil(U^2-W_{DAI,2}^{UL})/N\rceil \qquad (4)$$

$$B_2=W_{DAI}^{UL}+4\lceil(U-W_{DAI}^{UL})/4\rceil \qquad (5)$$

Where:
$W_{DAI,2}^{UL}$ is determined by the DAI-2 DCI format 0/4 according to Table 4 corresponding to different number of bits of the DAI.

$U^2$ indicates the total number of serving cells with a received PDSCH(s) and PDCCH transmission indicating a downlink SPS release detected by the UE across all serving cells within a HARQ-ACK bundling window constructed according to Table 5.

N=4, 8 or 16, respectively, corresponds to a 2-bit, 3-bit, or 4-bit DAI field.

$W_{DAI}^{UL}$ is determined by the legacy DAI in DCI format 0/4 according to Table 4 corresponding to a 2-bit DAI field.

U denotes the maximum value of $U_c$ among all the configured serving cells, $U_c$ is the total number of received PDSCHs and PDCCH transmissions indicating a downlink SPS release in a HARQ-ACK bundling window on serving cell c.

$\lceil \ \rceil$ is a ceiling operator.

For TDD, the HARQ-ACK feedback bits $O_{DAI_2(c),0}^{ACK}$, $O_{DAI_2(c),1}^{ACK}, \ldots, O_{DAI_2(c),O_c^{ACCK}-1}^{ACK}$ for the c-th serving cell are constructed following equation (3), where $DAI_2$ (c) is the value of the DAI-2 field of the DCI format 1A/1B/1D/1/2/2A/2B/2C/2D detected in the c-th serving cell and $O_c^{ACK}=B_2$, where $B_2$ is calculated as above in equation (5).

For TDD UL-DL configuration 1-6, the HARQ-ACK for a PDSCH transmission with a corresponding PDCCH or for a PDCCH indicating downlink SPS release in subframe n–k in c-th serving cell may be associated with $O^{ACK}_{DAI_2(c),DAI(k,c)-1}$, where $DAI_2$ (c) and DAI(k,c) are the values of the DAI-2 field and 2 bit DAI field in DCI format 1A/1B/1D/1/2/2A/2B/2C/2D detected in subframe n–k in the c-th serving cell.

Figure 7:
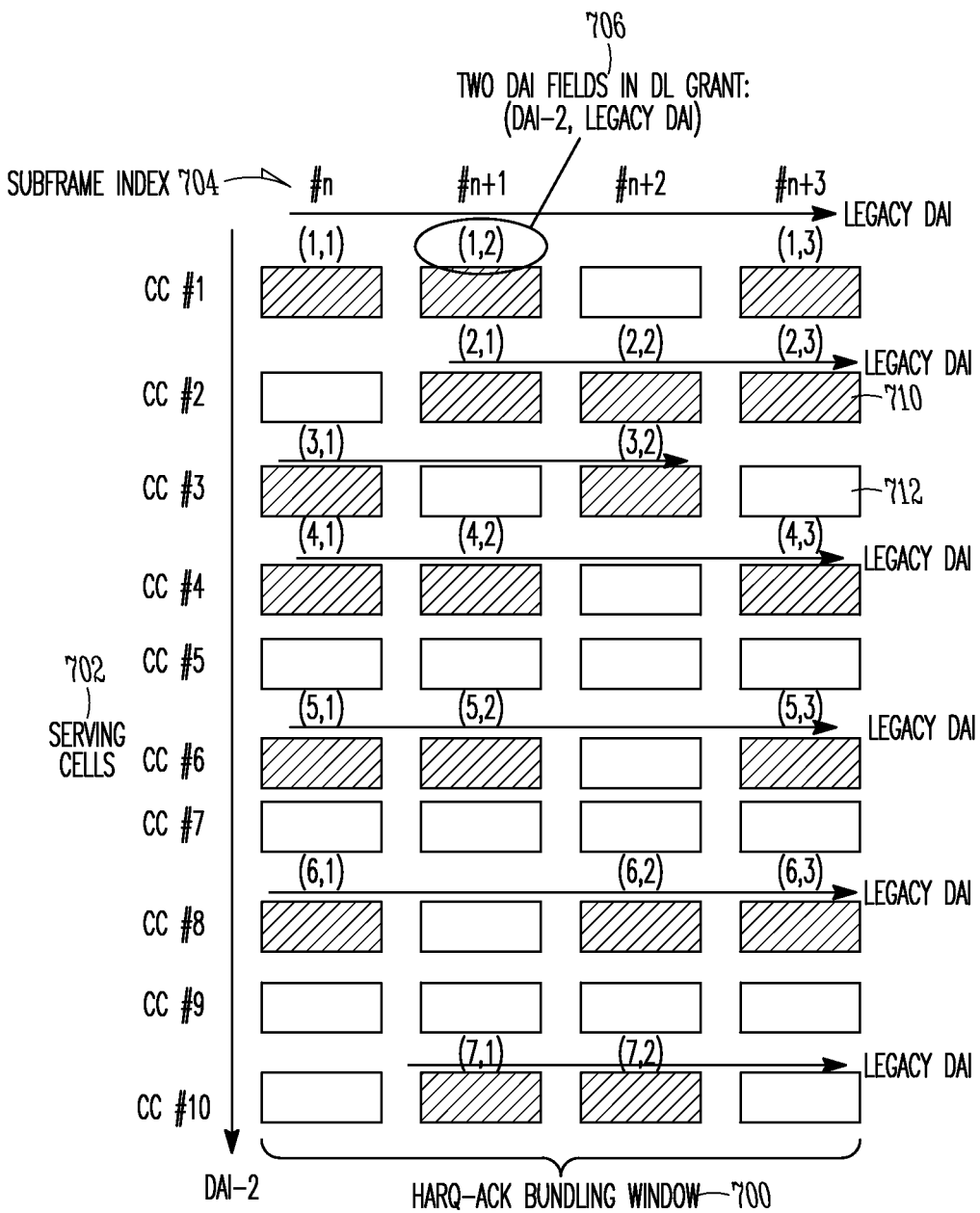
FIG. 7 illustrates DAI-2 and DAI field settings according to some embodiments.

FIG. 7 illustrates DAI-2 and DAI field settings according to some embodiments. In particular, FIG. 7 illustrates an example of the manner the DAI-2 and DAI field 706 values are set in DCI format used for scheduling PDSCH (e.g. DCI format 1A/1B/1D/1/2/2A/2B/2C/2D) in each corresponding DL subframe in configured serving cells, given the PDSCH transmission pattern shown. The HARQ-ACK bundling window 700 of four subframes in FIG. 7 contains ten aggregated CCs 702, in which subframes 704 having indexes n, n+1, n+2 and n+3 are shown. The CCs (i.e. serving cells) 702 in each subframe 704 may include a PDSCH CC 710 that contains a PDSCH transmission or a non-PDSCH CC 712 that does not contain a PDSCH transmission in any downlink subframe of the HARQ-ACK bundling window 700. The first number in the parenthesis of the DAI-2 and DAI fields 706 is the DAI-2 value that denotes the accumulative number of all different CCs 702 containing PDSCH transmissions in at least one subframe 702 within the bundling window 700 and may be updated from CC to CC from CC0 in the ascending order of the downlink CCs, while the second number indicates the accumulative number of subframes 704 with PDSCH transmissions and with a PDCCH/EPDCCH transmission indicating a downlink SPS release to the corresponding UE of a particular CC 702 within the bundling window 700. Thus, although CC2 in subframe n does not contain a PDSCH transmission, the DAI-2 number of CC3 in subframe n is 3 as CC2 contains a PDSCH transmission in at least one other subframe (subframe n, n+2 and n+3). As shown in the example of FIG. 7, only CC5, 7 and 9 do not contain a PDSCH transmission in any subframe of the bundling window, resulting in the maximum DAI-2 being 7. Similarly, the maximum number of subframes in which any CC contains a PDSCH transmission in the bundling window is 3 (CC 1, 2, 4, 6 and 8, with CC 3 and 10 containing 2 PDSCH transmissions in different subframes). In this case, there are 19 PDSCH transmissions across a total of 7 CCs within the bundling window 700, so $W_{DAI,2}^{UL}=W_{DAI}^{DL}=3$ according to Table 4 and its physical meaning defined above, $U^2$ is 7 (7 CCs), N=4 for a 2 bit DAI-2, and U=3. Thus, $B_1=3+4\lceil(7-3)/4\rceil=7$, $B_2=3+4\lceil(3-3)/4\rceil=3$, and $O^{ACK}=21$. Accordingly, in this example, the UE provides a PUSCH feedback of 21 HARQ-ACK bits to the eNB in an ACK/NACK response after performing by a logical AND operation of the corresponding individual HARQ-ACKs within a DL or special subframe.

Figure 8:
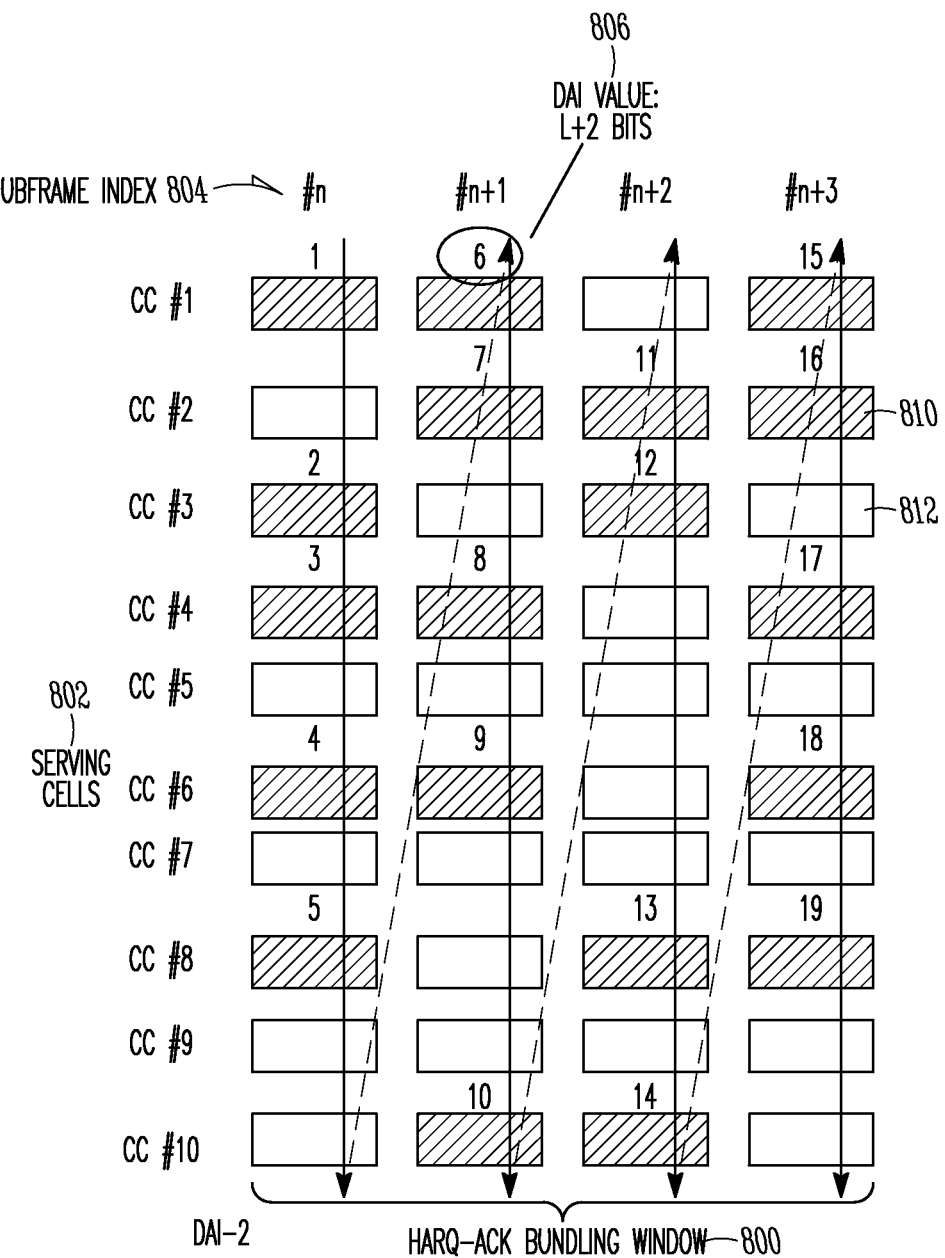
FIG. 8 illustrates DAI-2 and DAI determination according to some embodiments.

FIG. 8 illustrates DAI-2 and DAI determination according to some embodiments. The HARQ-ACK bundling window 800 of four subframes contains ten aggregated CCs 802, in which subframes 804 having indexes n, n+1, n+2 and n+3 are shown. The CCs 802 in each subframe 804 include a PDSCH CC 810 that contains a PDSCH transmission or a non-PDSCH CC 812 that does not contain a PDSCH transmission. In particular, in FIG. 8 the new Z-bit DAI-2 field and the 2-bit legacy DAI field in DCI format 0/4 may be combined to a joint DAI field 806 that indicates the total number of subframes with PDSCH transmissions and with a PDCCH/EPDCCH transmission indicating a downlink SPS release to the corresponding UE within the associated HARQ-ACK bundling window 800 among all the configured serving cells 802. Thus, as shown, within the associated HARQ-ACK bundling window 800, in each of subframe n, n+1 and n+3, 5 serving cells (CCs) 802 contain PDSCH/PDCCH/EPDCCH transmissions, 4 serving cells contain PDSCH/PDCCH/EPDCCH transmissions in subframe n+2. Note that the PDSCH CCs 810 and non-PDSCH CCs 812 may differ between subframes 804. This results in a joint DAI value 806 of 19. Similarly, the L-bits DAI-2 field and the 2 bit legacy DAI field in DCI format 1A/1B/1D/1/2/2A/2B/2C/2D may be combined to form a joint DAI field 806 that indicates the accumulative number of subframes with a PDSCH transmission.

Figure 9:
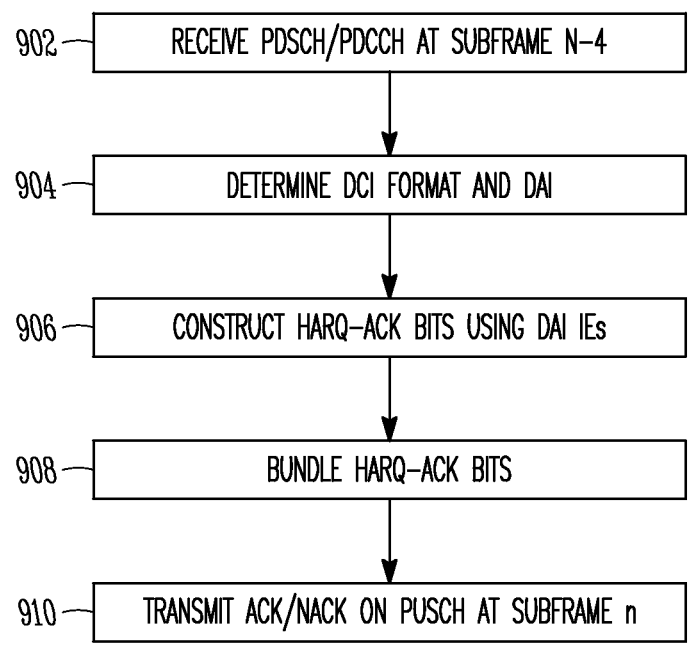
FIG. 9 illustrates a flowchart of a method of using a HARQ-ACK transmission with reduced overhead in accordance with some embodiments.

FIG. 9 illustrates a flowchart of a method of using a HARQ-ACK transmission with reduced overhead in accordance with some embodiments. At operation 902, the UE may receive a PDSCH or PDCCH/EPDCCH transmission indicating a downlink SPS release. The UE may determine that the PDSCH or PDCCH/EPDCCH transmission is specifically for the UE as the CRC of the DCI formats transmitted on PDCCH/EPDCCH may be scrambled using the C-RNTI. The PDSCH or PDCCH transmission may be received in a particular subframe (subframe n–4).

At operation 904, the UE may determine the DCI format from the PDSCH or PDCCH transmission. The DCI format may include different DAI fields including a legacy DAI IE used in system or network employing 3GPP LTE Release 12 communications and a multi-bit DAI-2 IE whose value may depend on the type of transmission (FDD or TDD) as well as the number of subframes or serving cells or CCs containing either the PDSCH or PDCCH transmission indicating a downlink SPS release.

The UE may construct each of the HARQ-ACK bits using the value of the DAI-2 at operation 906. The UE may extract the DAI field value in the DCI format. The UE may determine a total number of serving cells, CCs, or subframes with PDSCH transmissions and with a PDCCH/EPDCCH transmission indicating a downlink SPS release in the subframe n–4 from the DAI value in a FDD DCI format 0/4. The UE may determine an accumulative number of serving cells, CCs, or subframes with PDSCH transmissions and with a PDCCH/EPDCCH transmission indicating a downlink SPS release in the subframe n–4 from the DAI value in a FDD DCI format 1/1A/1B/1D/2/2A/2B/2C/2D transmission. Similarly UE may determine a total number of serving cells or CCs with PDSCH transmissions and with a PDCCH/EPDCCH transmission indicating a downlink SPS release within the associated subframes n–k in a bundling window from the DAI value in a TDD DCI format 0/4. The UE may also determine an accumulative number of serving cells or CCs with PDSCH transmissions and with a PDCCH/EPDCCH transmission indicating a downlink SPS release within the associated subframes n−k in a bundling window from the DAI value in a TDD DCI format 1/1A/1B/1D/2/2A/2B/2C/2D transmission.

After calculating the total number of the HARQ-ACK bits using the above equations and tables, the UE may at operation 908 first bundle the HARQ-ACK bits to reduce the size of the overall HARQ-ACK bits. After bundling the HARQ-ACK bits by a logical ANDing operation across transport blocks in a downlink subframe or special subframe, the UE may determine the ordering of the bundled HARQ-ACK bits to avoid ambiguity in the association between the HARQ-ACK bits and corresponding component carriers/transport blocks. Having determined the total number of HARQ-ACK bits and ordering of the bundled HARQ-ACK bits, the UE may construct the the HARQ-ACK bits string in the appropriate order for transmission on the PUSCH.

In response to forming the HARQ-ACK transmission, the UE may then at operation 910 transmit the HARQ-ACK feedback to the eNB. The UE may transmit an ACK/NACK in the uplink subframe n, four subframes after the PDSCH/PDCCH reception.

Example 1 can include subject matter, such as apparatus of a user equipment device, comprising processing circuitry configured to: configure a transceiver, configured to transmit and receive signals from an enhanced Node-B (eNB), to receive a subframe containing a physical downlink control channel (PDCCH) formed in accordance with a first Downlink Control Information (DCI) format, the DCI format comprising a first Downlink Assignment Index (DAI) field for Time Division Duplexed (TDD) and Frequency Division Duplexed (FDD) operation; determine, dependent on the DAI, a number and order of Hybrid Automatic Repeat Request-Acknowledgment (HARQ-ACK) bits to be transmitted on a Physical Uplink Shared Channel (PUSCH); and configure the transceiver to transmit a PUSCH containing the generated HARQ-ACK bits.

Example 2 can include the subject matter of Example 1 and optionally include that the DCI format comprises at least one of a DCI format used for PUSCH scheduling and a DCI format used for Physical Downlink Shared Channel (PDSCH) scheduling.

Example 3 can include the subject matter of one or any combination of Examples 1-2 and optionally include that the DCI format further comprises a second DAI field for TDD operation rather than FDD operation.

Example 4 can include the subject matter of one or any combination of Examples 1-3 and optionally include that the first DCI format comprises the first DAI and a second DCI format used in a Third Generation Partnership Project Long Term Evolution (3GPP LTE) Release 12 system, the second DCI format comprising the second DAI rather than the first DAI.

Example 5 can include the subject matter of one or any combination of Examples 1-4 and optionally include that the first DAI comprises the second DAI and a third DAI, a number of bits of the third DAI in a DCI format used for scheduling PUSCH and in a DCI format used for scheduling Physical Downlink Shared Channel (PDSCH) are different or same.

Example 6 can include the subject matter of one or any combination of Examples 1-5 and optionally include that the value of the third DAI field in the DCI format used for scheduling PUSCH in a particular UL subframe in a FDD serving cell corresponds to a total number of serving cells with PDSCH transmissions and with a PDCCH or an enhanced PDCCH (EPDCCH) indicating a downlink semi-persistent scheduling (SPS) release in a corresponding DL subframe four subframes prior to the particular UL subframe used for the transmission of determined HARQ-ACK bits.

Example 7 can include the subject matter of one or any combination of Examples 1-6 and optionally include that the value of the third DAI in the DCI format used for scheduling PDSCH in a particular DL subframe in a FDD or TDD serving cell corresponds to an accumulative number of PDCCHs and enhanced PDCCHs (EPDCCH) with assigned PDSCH transmissions and PDCCHs and EPDCCHs indicating a downlink semi-persistent scheduling (SPS) release across all serving cells within a number of DL subframes associated with a single UL subframe for HARQ-ACKs transmission based on a predefined HARQ timing relationship and shall be updated from serving cell to serving cell.

Example 8 can include the subject matter of one or any combination of Examples 1-7 and optionally include that the value of the third DAI in the DCI format used for scheduling PUSCH in a particular UL subframe in a TDD serving cell corresponds to a total number of serving cells with PDSCH transmissions and with a PDCCH or an enhanced PDCCH (EPDCCH) indicating a downlink semi-persistent scheduling (SPS) release to the UE within an associated HARQ-ACK bundling window (i.e. a number of DL subframes associated with the particular UL subframe for HARQ-ACKs transmission) dependent on a predefined HARQ timing relationship.

Example 9 can include the subject matter of one or any combination of Examples 1-8 and optionally include that the value of the second DAI in the DCI format used for scheduling PUSCH in a particular UL subframe corresponds to a total number of subframes with PDSCH transmissions and with a PDCCH or an enhanced PDCCH (EPDCCH) indicating downlink semi-persistent scheduling (SPS) release to the UE within an associated HARQ-ACK bundling window among all configured serving cells based on a predefined HARQ timing relationship.

Example 10 can include the subject matter of one or any combination of Examples 1-9 and optionally include that the value of the second DAI in the PDSCH DCI format corresponds to an accumulative number of subframes with PDSCH transmissions and PDCCH/EPDCCH indicating DL SPS releases up to the present subframe within an associated HARQ-ACK bundling window among all configured serving cells based on a predefined HARQ timing relationship.

Example 11 can include the subject matter of one or any combination of Examples 1-10 and optionally include that a number of HARQ-ACK bits in a PUSCH in subframe n is $O^{ACK}$, and $O^{ACK}=W_{DAI}^{UL}+N\lceil(U-W_{DAI}^{UL})/N\rceil$, where: U indicates a total number of received PDSCHs and Physical Downlink Control Channels (PDCCHs) indicating a downlink semi-persistent scheduling (SPS) release detected by the UE in subframe n−4 across all serving cells, $W_{DAI}^{UL}$ is determined by the detected value of the third DAI field in DCI format 0/4 in subframe n−4, and N=4, 8 or 16 depending on a number of bits of the third DAI as defined in previous Tables. $\lceil x \rceil$ is ceiling function to get the smallest integer not less than x Example 12 can include the subject matter of one or any combination of Examples 1-11 and optionally include that a number of HARQ-ACK bits in a PUSCH in subframe n is $O^{ACK}$, $O^{ACK}=B_1 \times B_2$, $B_1=W_{DAI,2}^{UL}+N\lceil(U^2-W_{DAI,2}^{UL})/N\rceil$, and $B_2=W_{DAI}^{UL}+4\lceil(U-W_{DAI}^{UL}/4)\rceil$, where $W_{DAI,2}^{UL}$ is determined by the value of the third DAI in detected DCI format 0/4, $U^2$ indicates a total number of serving cells with received PDSCHs and PDCCHs indicating downlink semi-persistent scheduling (SPS) release detected by the UE across all serving cells within a HARQ-ACK bundling window, N=4, 8 or 16 depending on a number of bits in the third DAI, $W_{DAI}^{UL}$ is determined by the second DAI, U indicates a maximum value of $U_c$ among all configured serving cells, and $U_c$ is a total number of received PDSCHs and PDCCHs indicating a downlink SPS release in the HARQ-ACK bundling window.

Example 13 can include the subject matter of one or any combination of Examples 1-12 and optionally include that an antenna configured to provide communications between the transceiver and the serving cells.

Example 14 can include subject matter including a non-transitory computer-readable storage medium that stores instructions for execution by one or more processors of user equipment (UE) to communicate with a plurality of serving cells, the one or more processors to configure the UE to: receive a subframe containing a physical downlink control channel (PDCCH) formed in accordance with a first Downlink Control information (DCI) format, the DCI format comprising a first Downlink Assignment Index (DAI) for Time Division Duplexed (TDD) and Frequency Division Duplexed (FDD) operation added to a legacy second DCI format used in a Third Generation Partnership Project Long Term Evolution (3GPP LTE) Release 12 or earlier system, the second DCI format comprising the second DAI rather than the first DAI; determine, dependent on the value of the first DAI, a number and order of Hybrid Automatic Repeat Request-Acknowledgment (HARQ-ACK) bits to be transmitted on a Physical Uplink Shared Channel (PUSCH); and transmit a PUSCH containing the determined HARQ-ACK bits.

Example 15 can include the subject matter of Example 14 and optionally include that the first DAI field comprises and a second DAI for TDD operation and a third DAI field, and the number of bits of the third DAI in a DCI format used for scheduling PUSCH and in a DCI format used for scheduling PDSCH are same or different.

Example 16 can include the subject matter of one or any combination of Examples 14-15 and optionally include that the third DAI in the DCI format used for scheduling PUSCH in a particular subframe in a FDD serving cell corresponds to a total number of serving cells with PDSCH transmissions and with a PDCCH or an enhanced PDCCH (EPDCCH) indicating a downlink semi-persistent scheduling (SPS) release in a corresponding DL subframe four subframes prior to the particular UL subframe used for the transmission of determined HARQ-ACK bits.

Example 17 can include the subject matter of one or any combination of Examples 14-16 and optionally include that the third DAI in the DCI format used for scheduling PDSCH in a particular DL subframe in a FDD or TDD serving cell corresponds to an accumulative number of PDCCHs and enhanced PDCCHs (EPDCCH) with assigned PDSCH transmissions and PDCCHs and EPDCCHs indicating a downlink semi-persistent scheduling (SPS) release across all serving cells in a bundling window.

Example 18 can include the subject matter of one or any combination of Examples 14-17 and optionally include that the value of the third DAI in the DCI format used for scheduling PUSCH in a particular UL subframe in a TDD serving cell corresponds to a total number of serving cells with PDSCH transmissions and with a PDCCH or an enhanced PDCCH (EPDCCH) indicating a downlink semi-persistent scheduling (SPS) release to the UE within an associated HARQ-ACK bundling window based on a predefined HARQ-ACK timing relationship.

Example 19 can include the subject matter of one or any combination of Examples 14-18 and optionally include that the value of the second DAI in the DCI format used for scheduling PUSCH in a particular UL subframe corresponds to a total number of subframes with PDSCH transmissions and with a PDCCH or an enhanced PDCCH (EPDCCH) indicating downlink semi-persistent scheduling (SPS) release to the UE within an associated HARQ-ACK bundling window among all configured serving cells dependent on a predefined HARQ timing relationship.

Example 20 can include the subject matter of one or any combination of Examples 14-19 and optionally include that the value of the second DAI in the DCI format used for scheduling PDSCH corresponds to an accumulative number of subframes with PDSCH transmissions and PDCCH/EPDCCH indicating DL SPS releases up to the present subframe within an associated HARQ-ACK bundling window for a serving cell based on a predefined HARQ timing relationship.

Example 21 can include subject matter of an apparatus of an eNB configured to communicate with user equipment (UE), the apparatus comprising: processing circuitry configured to: configure a transceiver to transmit to a first UE a subframe containing a physical downlink control channel (PDCCH) formed in accordance with a first Downlink Control information (DCI) format, the first DCI format comprising a first Downlink Assignment Index (DAI) field for Time Division Duplexed (TDD) and Frequency Division Duplexed (FDD) operation; configure the transceiver to transmit to a second UE a subframe containing a PDCCH formed in accordance with a second DCI format, the second DCI format comprising a second DAI field for TDD operation; and configure the transceiver to receive Hybrid Automatic Repeat Request-Acknowledgment (HARQ-ACK) responses on Physical Uplink Shared Channels (PUSCHs) from the first and second UEs, wherein the HARQ-ACK response from the first UE has a reduced size compared with the HARQ-ACK response from the second UE based on the first and second DCI formats.

Example 22 can include the subject matter of Example 21 and optionally include that the first DAI comprises the second DAI and a third DAI, and the number of bits of the third DAI in a DCI format used for scheduling PUSCH and in a DCI format used for scheduing Physical Downlink Shared Channel (PDSCH) are same or different.

Example 23 can include the subject matter of one or any combination of Examples 21-22 and optionally include that the third DAI in the DCI format used to schedule PUSCH in a particular subframe in a FDD serving cell corresponds to a total number of serving cells with PDSCH transmissions and with a PDCCH or an enhanced PDCCH (EPDCCH) indicating a downlink semi-persistent scheduling (SPS) release in a subframe four subframes prior to the particular subframe, the value of the third DAI in the DCI format used for scheduling PDSCH in a particular subframe corresponds to an accumulative number of PDCCHs and EPDCCH with assigned PDSCH transmissions and PDCCHs and EPDCCHs indicating a SPS release in serving cells in the particular subframe, the value of the third DAI in the DCI format used for scheduling PUSCH in a particular UL subframe in a TDD serving cell corresponds to a total number of serving cells with PDSCH transmissions and with a PDCCH or an EPDCCH indicating a downlink SPS release to the UE within an associated HARQ-ACK bundling window dependent on a predefined HARQ timing relationship, the second DAI in the DCI format used for scheduling PUSCH in a particular subframe corresponds to a total number of subframes with PDSCH transmissions and with a PDCCH or an EPDCCH indicating downlink SPS release to the UE within an associated HARQ-ACK bundling window among all configured serving cells dependent on a predefined HARQ timing relationship, or the second DAI in the DCI format used for scheduling PDSCH corresponds to an accumulative number of subframes with PDSCH transmissions and PDCCH/EPDCCH indicating DL SPS releases up to the present subframe within an associated HARQ-ACK bundling window on a serving cell dependent on a predefined HARQ timing relationship.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus of a user equipment (UE) comprising:
a transceiver; and
processing circuitry in communication with the transceiver and configured to:
configure the transceiver to receive a subframe containing a physical downlink control channel (PDCCH) formed in accordance with a first Downlink Control Information (DCI) format, the first DCI format comprising a first Downlink Assignment Index (DAI) field for Time Division Duplexed (TDD) and Frequency Division Duplexed (FDD) operation;
determine, dependent on a value of the first DAI field, a number and order of Hybrid Automatic Repeat Request-Acknowledgment (HARQ-ACK) bits to be transmitted on a Physical Uplink Shared Channel (PUSCH); and
configure the transceiver to transmit the PUSCH containing the determined HARQ-ACK bits,
the first DCI format comprises a second DAI field for TDD operation,
the first DAI field comprises the second DAI field and a third DAI field, and
a number of HARQ-ACK bits in a PUSCH in a current subframe is $O^{ACK}$, and $$O^{ACK} = W_{DAI}^{UL} + N \left\lceil \frac{(U - W_{DAI}^{UL})}{N} \right\rceil,$$

where:
$\lceil x \rceil$ is a ceiling function to obtain a smallest integer not less than x,
U indicates a total number of received Physical Downlink Shared Channels (PDSCHs) and Physical Downlink Control Channels (PDCCHs) indicating a downlink semi-persistent scheduling (SPS) release detected by the UE in a single previous subframe across all serving cells,
$W_{DAI}^{UL}$ is determined by a detected value of the third DAI field in the previous subframe according to a predefined table, and
N depends on a bit number of the third DAI field.

2. The apparatus of claim 1, wherein:
the first DCI format comprises at least one of a DCI format to schedule a PUSCH and a DCI format to schedule a Physical Downlink Shared Channel (PDSCH).

3. The apparatus of claim 1, wherein:
the first DCI format comprises the first DAI field and a second DCI format used in a Third Generation Partnership Project Long Term Evolution (3GPP LTE) Release 12 system, the second DCI format comprising the second DAI field rather than the first DAI field.

4. The apparatus of claim 1, wherein:
a number of information bits of the third DAI field in a DCI format to schedule a PUSCH and a number of information bits in a DCI format to schedule a Physical Downlink Shared Channel (PDSCH) are different.

5. The apparatus of claim 1, wherein:
a number of information bits of the third DAI field in a DCI format to schedule a PUSCH and a number of information bits in a DCI format to schedule a Physical Downlink Shared Channel (PDSCH) are the same.

6. The apparatus of claim 1, wherein:

$$O^{ACK} = W_{DAI}^{UL} + N \left\lceil \frac{(U - W_{DAI}^{UL})}{N} \right\rceil,$$

$W_{DAI}^{UL}$ is determined by a detected value of the third DAI field in DCI format 0/4, and
N=4, 8 or 16, corresponding to a 2-bit, 3-bit and 4-bit third DAI field respectively.

7. The apparatus of claim 6, wherein the processing circuitry is configured to:
generate a number of HARQ-ACK bits in a PUSCH with spatial HARQ-ACK bundling across multiple codewords within a downlink subframe by a logical AND operation.

8. The apparatus of claim 6, wherein the processing circuitry is configured to:
configure the transceiver to refrain from transmitting a HARQ-ACK on a PUSCH in response to the transceiver lacking receipt of one of a PDSCH and PDCCH indicating a downlink semi-persistent scheduling (SPS) release in subframe n−4 and $W_{DAI}^{UL}$=4, 8 or 16 respectively corresponding to a 2, 3, 4-bit third DAI field in one of DCI format 0 and 4.

9. The apparatus of claim 6, wherein:
the spatially bundled HARQ-ACK bit for a PDSCH with a corresponding PDCCH or for a PDCCH indicating a downlink semi-persistent scheduling (SPS) release in subframe n−4 is associated with $O_{B(k)-1}^{ACK}$ where B(k) is derived based on a value of DAI $V_{DAI,k}^{UL}$ in a DCI format to schedule a PDSCH detected in subframe n−4 in the k-th serving cell based on a predefined table depending on a number of bits of the third DAI field $$B(k) = V_{DAI,k}^{DL} + N \lceil (U_k - V_{DAI,k}^{DL})/N \rceil$$

where:
$U_k$ denotes a total number of received PDSCH(s) and PDCCH indicating a downlink SPS release detected by the UE in subframe n−4 cross all serving cells, and
N=4, 8 or 16 corresponding to a 2-bit, 3-bit and 4-bit third DAI field respectively.

10. The apparatus of claim 1, further comprising:
an antenna configured to provide communications between the transceiver and the serving cells.

11. A non-transitory computer-readable storage medium that stores instructions for execution by one or more processors of user equipment (UE) to communicate with a plurality of serving cells, the one or more processors to configure the UE to:
receive a subframe containing a physical downlink control channel (PDCCH) formed in accordance with a first Downlink Control information (DCI) format, the first DCI format comprising a first Downlink Assignment Index (DAI) for Time Division Duplexed (TDD) and Frequency Division Duplexed (FDD) operation added to a legacy DCI format used in a Third Generation Partnership Project Long Term Evolution (3GPP LTE) Release 12 or earlier system, a second DCI format comprising a second DAI rather than the first DAI;
determine, dependent on a value of the first DAI, a number and order of Hybrid Automatic Repeat Request-Acknowledgment (HARQ-ACK) bits to be transmitted on a Physical Uplink Shared Channel (PUSCH); and
transmit the PUSCH containing the determined HARQ-ACK bits, wherein
the first DCI format comprises a first DAI field, the first DAI field comprising a second DAI for TDD operation and a third DAI field, and
a number of HARQ-ACK bits in a PUSCH in a current subframe is $O^{ACK}$, and $$O^{ACK} = W_{DAI}^{UL} + N \left\lceil \frac{(U - W_{DAI}^{UL})}{N} \right\rceil,$$

where:
$\lceil x \rceil$ is a ceiling function to obtain a smallest integer not less than x,
U indicates a total number of received Physical Downlink Shared Channels (PDSCHs) and PDCCHs indicating a downlink semi-persistent scheduling (SPS) release detected by the UE in a single previous subframe across all serving cells,
$W_{DAI}^{UL}$ is determined by a detected value of the third DAI field in the previous subframe according to a predefined table, and
N depends on a bit number of the third DAI field.

12. The medium of claim 11, wherein:
a number of bits of the third DAI field in a DCI format to schedule a PUSCH and a number of information bits in a DCI format to schedule a Physical Downlink Shared Channel (PDSCH) are different.

13. An apparatus of an enhanced Node-B (eNB) configured to communicate with user equipment (UE), the apparatus comprising:
a transceiver; and
processing circuitry in communication with the transceiver and configured to:
configure the transceiver to transmit to a first UE a subframe containing a physical downlink control channel (PDCCH) formed in accordance with a first Downlink Control information (DCI) format, the first DCI format comprising a first Downlink Assignment Index (DAI) field for Time Division Duplexed (TDD) and Frequency Division Duplexed (FDD) operation;
configure the transceiver to transmit to a second UE a subframe containing a PDCCH formed in accordance with a second DCI format, the second DCI format comprising a second DAI field for TDD operation rather than FDD operation; and
configure the transceiver to receive Hybrid Automatic Repeat Request-Acknowledgment (HARQ-ACK) responses on Physical Uplink Shared Channels (PUSCHs) from the first and second UEs, wherein the HARQ-ACK response from the first UE has a reduced payload size compared with the HARQ-ACK response from the second UE based on the first and second DCI formats, wherein the first DCI format comprises a first DAI field, the first DAI field comprising a second DAI for TDD operation and a third DAI field, and a number of HARQ-ACK bits in a PUSCH in a current subframe is $O^{ACK}$, and $$O^{ACK} = W_{DAI}^{UL} + N \left\lceil \frac{(U - W_{DAI}^{UL})}{N} \right\rceil,$$

where:

$\lceil x \rceil$ is a ceiling function to obtain a smallest integer not less than x, U indicates a total number of received Physical Downlink Shared Channels (PDSCHs) and PDCCHs indicating a downlink semi-persistent scheduling (SPS) release detected by the UE in a single previous subframe across all serving cells, $W_{DAI}^{UL}$ is determined by a detected value of the third DAI field in the previous subframe according to a predefined table, and N depends on a bit number of the third DAI field.

\* \* \* \* \*

UNITED STATES PATENT AND TRADEMARK OFFICE
CERTIFICATE OF CORRECTION

PATENT NO. : 9,686,064 B2
APPLICATION NO. : 14/751054
DATED : June 20, 2017
INVENTOR(S) : He et al.

Page 1 of 1

It is certified that error appears in the above-identified patent and that said Letters Patent is hereby corrected as shown below:

In the Claims

In Column 23, Line 42, in Claim 9, delete "$V_{DAI,k}{}^{UL}$" and insert --$V_{DAI,k}^{DL}$-- therefor Signed and Sealed this
Fourteenth Day of April, 2020

Andrei Iancu
*Director of the United States Patent and Trademark Office*